United States Patent [19]

Ashauer et al.

[11] 4,282,765
[45] Aug. 11, 1981

[54] ANGLE GEAR FOR VEHICLE STEERING MECHANISM

[75] Inventors: Karl Ashauer; Fritz Blumenstein, both of Wolfsburg, Fed. Rep. of Germany

[73] Assignee: Volkswagenwerk Aktiengesellschaft, Fed. Rep. of Germany

[21] Appl. No.: 54,892

[22] Filed: Jul. 5, 1979

[30] Foreign Application Priority Data

Jul. 7, 1978 [DE] Fed. Rep. of Germany ....... 2829895

[51] Int. Cl.$^3$ ............................................. F16H 1/14
[52] U.S. Cl. ...................................... 74/417; 74/400; 74/409; 74/410
[58] Field of Search ................. 74/416, 417, 409, 410, 74/395, 400

[56] References Cited

U.S. PATENT DOCUMENTS

| 2,032,732 | 3/1936 | Zerbe | 74/417 X |
| 2,996,929 | 8/1961 | Lazavowicz | 74/417 |
| 3,350,958 | 11/1967 | Casale | 74/417 |
| 3,469,469 | 9/1969 | Karl-Heinzburger | 74/409 |
| 3,774,466 | 11/1973 | Bhatia et al. | 74/417 |

FOREIGN PATENT DOCUMENTS 1016135 9/1957 Fed. Rep. of Germany .

Primary Examiner—C. J. Husar
Assistant Examiner—Conrad Berman
Attorney, Agent, or Firm—Brumbaugh, Graves, Donohue & Raymond

[57] ABSTRACT

An angle gear for a vehicle steering mechanism includes two bevel gears which can be axially displaced in a housing in order to adjust the rotation backlash of the gear. The axes of the bevel gears form an angle relative to each other and are connected, respectively, to a shaft leading to the steering shaft and a shaft leading to the steering mechanism on the vehicle axle. Axial motion away from the intersection of the shaft axes, which would increase the backlash, is prevented by thrust bearings supported against the housing. Axial motion in the other direction is secured against by means of shackle with spherical cup bearing surfaces that bear against the end faces of the bevel gears, which shackle is adjustable to compensate for the manufacturing tolerances of the bevel gears.

8 Claims, 3 Drawing Figures

ANGLE GEAR FOR VEHICLE STEERING MECHANISM

BACKGROUND OF THE INVENTION

The invention concerns an angle gear for a vehicle steering mechanism with bevel gears which can be axially displaced in a housing and whose axes form an angle with each other.

It is frequently necessary, particularly in vehicles with controlled axles arranged essentially below the passenger compartment, e.g., in small goods carriers and buses designed as front wheel drive vehicles, to insert an angle gear into the steering mechanism. This angle gear transmits the steering movement from the steering shaft, which suitably extends towards the front and bottom of the vehicle with an inclination, to the shaft leading to the steering mechanism arranged on the controlled axle.

In order to ensure the quality of such angle gears, it is necessary to adjust the bevel gear pairs of these angle gears that mesh with each other, with the smallest possible rotation backlash. On the other hand, such rotation backlash must not be eliminated in its entirety because in such a case there would arise the danger of the tooth flanks squeezing each other during rotation of the gears. Such an adjustment of the rotation backlash of the bevel gears to the smallest possible values may be obtained by the insertion of correspondingly dimensioned spacers or thrust washers between the housing of the angle gear and the bevel gears. As a result, the bevel gear shafts must be axially adjustable in opposition to the forces that occur during a steering operation, i.e. in the direction towards the intersection of the axes of the two shafts. Such axial adjustability of the bevel gear shafts, however, is disadvantageous in that in case of a load on the bevel gears in opposition to the forces generated during steering, e.g. due to axial stress on the steering shaft or distortions of the vehicle frame, the bevel gears are still axially stressed in the direction towards elimination of all rotation backlash, with all the detrimental consequences resulting therefrom.

SUMMARY OF THE INVENTION

It is the purpose of the present invention to create an angle gear including bevel gears for use in the steering mechanism of a vehicle, wherein an axial displacement of the bevel gear shafts, due to stresses occuring during operation and in opposition to the tooth forces originated by the steering moments, can be easily avoided, in spite of a favorable adjustability of the gear rotation backlash.

This purpose is attained in accordance with the invention in that a support arrangement with bearing surfaces directed essentially perpendicular to a line between the end faces of the bevel gears and bearing against them on the housing, is maintained for axial support of the gears. It is useful if the support arrangement is designed for infinitely variable compensation of axial tolerance variations of the bevel gears. In accordance with a further refinement of the invention, the bearing faces may be provided with a spherical cup-like surface and a coating, e.g., of a material that decreases wear and tear.

A preferred form of embodiment of the invention provides that the support arrangement comprises a shackle having the bearing surfaces and being adjustably fastened on two lateral support surfaces of the housing by means of fastening screws. The shackle extends essentially perpendicular to the line bisecting the angle between the bevel gear axes. Adjustability of the shackle is obtained in that the shackle is provided with longitudinal slots for passage of the fastening screws, said slots being suitably curved in the form of a circular arc so that favorable guiding of the shackle is obtained. The fastening screws may be secured against loosening in that an assembly opening of the housing, concentric with the angle bisecting line of the bevel gear axes, can be closed by a lid provided with a circular ring collar that bears against the radially outer key faces of the fastening screws.

The angle gear, in accordance with the invention, makes it possible to adjust the bevel gears relatively simply and precisely in the axial direction that reduces rotation backlash to as small a value as possible, either by inserting thrust washers of different thicknesses between the housing of the angle gear and the bevel gears, or by machining the stop faces of the housing in conformity with the precisely measured bevel gears to be installed. The axial adjustability of the bevel gears is eliminated, following setting of the rotation backlash, by fixing the support arrangement on the housing of the angle gear in accordance with the invention. The support arrangement is then adjusted in such a manner that the bearing faces it contains act directly on the end faces of the bevel gears, which are designed as thrust surfaces, so as to secure them in their axial position. In particular, the bevel gears are secured against such forces as are directed in opposition to the tooth forces generated in the bevel gears during the steering operation.

BRIEF DESCRIPTION OF THE DRAWINGS

An example of an embodiment of the invention is explained in detail below and is shown in the accompanying drawings wherein.

DESCRIPTION OF A PREFERRED EMBODIMENT

Figure 1:
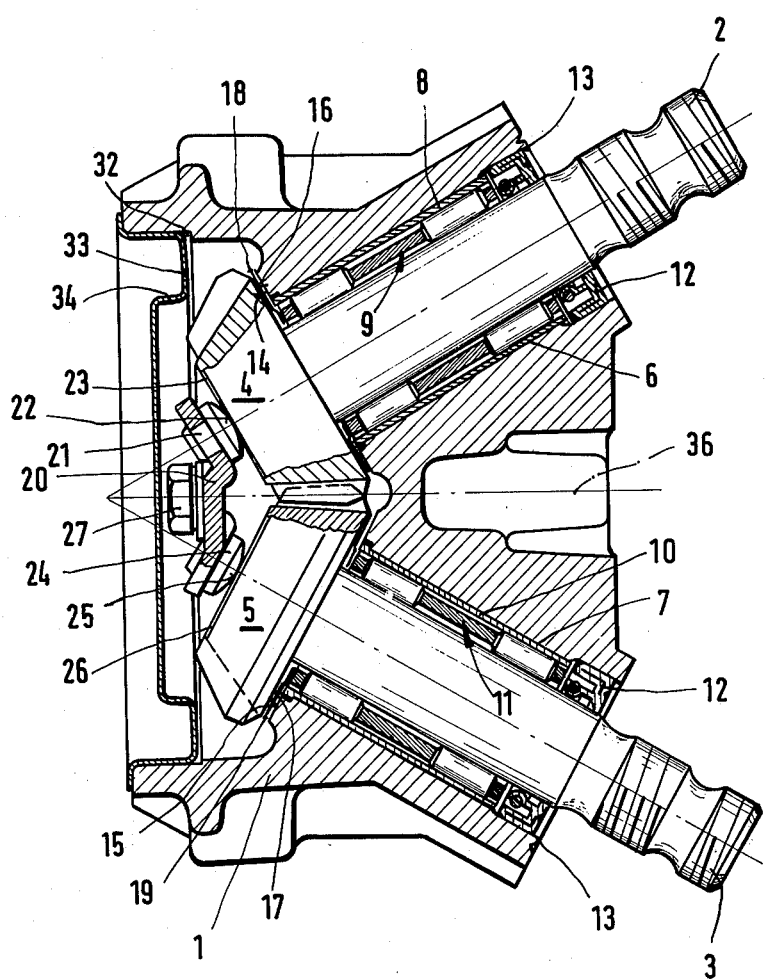
FIG. 1 shows a longitudinal section through an angle gear in accordance with the present invention.

In the drawing an angle gear which is provided for the steering of a front wheel drive vehicle has a housing 1. A shaft 2 is provided with a bevel gear 4 of the angle gear and is connected with a steering shaft, not shown. A shaft 3 provided with another bevel gear 5 leads to the steering mechanisms of the vehicle, likewise not shown, on the axle of the vehicle. The axes of the shafts 2 and 3 intersect at an angle which, in the example represented here, is less than 90°. The shafts 2 and 3 are supported in needle roller bearings 9 and 11 whose outer races 8 and 10 are maintained in bores 6 and 7 of the housing 1. Seals 12 are provided in the bores on the side walls remote from the bevel gears. They are secured in the axial direction by means of caulkings or wedgings 13 provided at the end face of the housing and distributed over the periphery of the bores.

Between bearings surfaces 14 and 15 of the housing and rear end faces 16 and 17 of the bevel gears 4 and 5 associated therewith, there are provided thrust washers 18 and 19. These washers may possibly have various thicknesses for the purpose of compensating tolerance deviations of the bevel gears and for adjusting the rotation backlash of the bevel gears. However, it is also possible to separately machine the bearing surfaces 14 and 15 of the housing 1, with the help of automatic machining devices, after the bevel gears to be assembled in the pertinent housings have been measured, so that following insertion of a thrust washer having a constant thickness, a predetermined rotation backlash is attained. As a result, the bevel gears 4 and 5 are secured axially in one direction.

Figure 2:
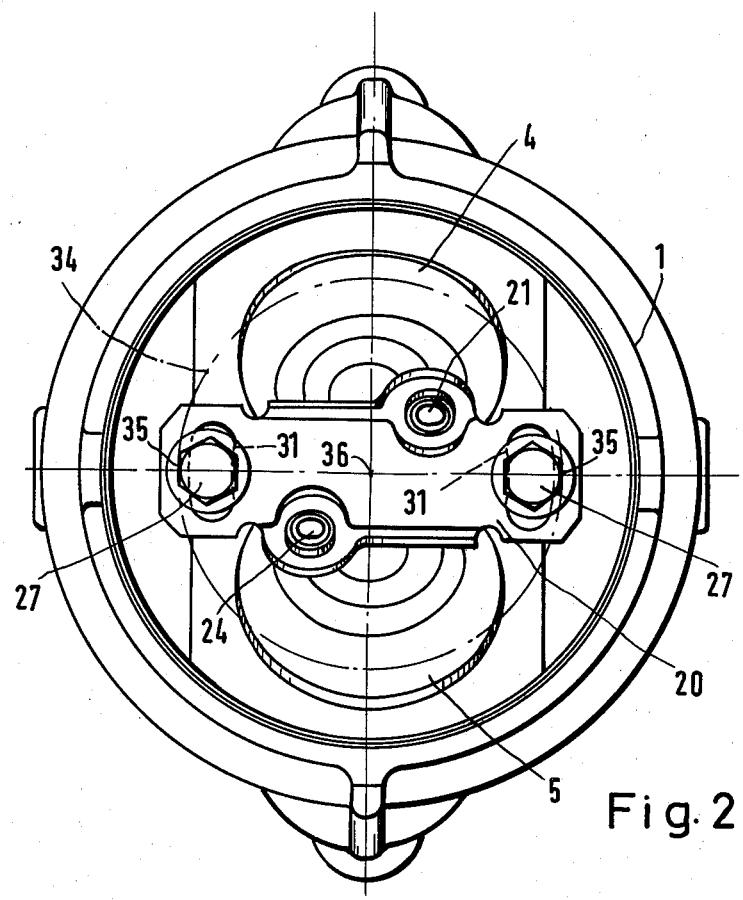
FIG. 2 shows a view from the lid side of the housing.
Figure 3:
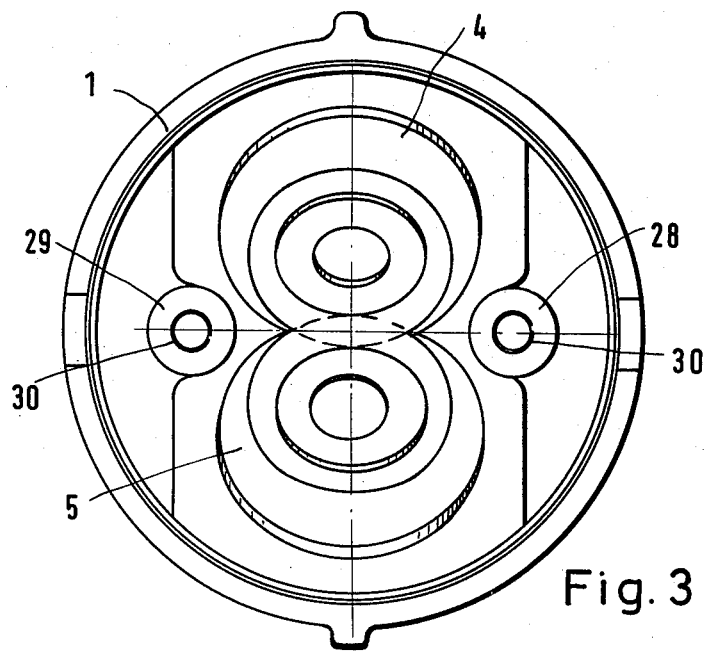
FIG. 3 is a partial view of the lid side of the housing, with both the lid and the supporting shackle removed.

In order to obtain a support of the bevel gears in the other direction also, thereby excluding an elimination of the small backlash provided, e.g. due to forces created during operation and extending in the direction toward the intersection of the shaft axes, a shackle 20 is provided for support. It is fastened adjustably by means of two fastening screws 27 on lateral bearing surfaces 28 and 29 of the housing 1. The adjustment is obtained in that on the shackle 20 there are provided longitudinal slots 31 extending in the shape of a circular arc and through which pass the fastening screws 27 in order to be secured in the threads 30 on the support faces 28 and 29. The support faces 28 and 29 are essentially perpendicular to the angle bisecting line 36 of the axes of the shafts 2 and 3 so that the shackle 20 is also placed in the same plane. Bearing elements 21 and 24 are fastened in the manner of rivets to the shackle. These elements bear, by way of bearing surfaces 22 and 25 which are shaped like spherical cups, against the end faces 23 and 25 of the bevel gears 4 and 5, which faces are designed as thrust surfaces. Faultless application of the bearing elements 21 and 24 against the end faces 23 and 26 of the bevel gears 4 and 5, whose positions may differ because of tolerance variations in the manufacture of the bevel gears 4 and 5, is obtained as a result of the adjustability of the support shackle 20. The adjustability is achieved because the shackle can be displaced within the limits defined by the circular arc longitudinal slots 31 and can be adjusted during assembly of the angle gear in such a manner that the bearing elements 21 and 24, which are directed essentially perpendicular to the end faces of the bevel gears, are applied against the associated end faces. After the fastening screws 27 have been tightened, they are secured against loosening in that a lid 33 introduced into an assembly opening 32 of the housing 1 has its ring collar 34, located radially outward relative to the center axis 36, bear against the key faces 35 of the fastening screws 27. The ring collar is shown in FIG. 2 in dots and dashes for the sake of simplicity. FIG. 2 illustrates the application of this ring collar against the key faces.

The angle gear in accordance with the invention is assembled by initially introducing the outer races 8 and 10 of the bearings 9 and 11 into the corresponding bores 6 and 7 of the housing 1 and securing them axially by a collar on the side facing the assembly opening. Thereafter, the shafts 2 and 3, provided with the thrust washers 18 and 19, but not with the bearings 9 and 11, are threaded in. Subsequently, the bearings 9 and 11 are slid in from the side of the bores 6 and 8 opposite the assembly opening 32 and, following assembly of the sealing rings 12, are secured axially together with the rings by means of caulking 13. Following this, the support shackle 20 is placed on the bearing surfaces 28 and 29 of the housing 1 and is secured by the fastening screws 27 which had been threaded in loosely. The fastening screws are tightened only after a corresponding rotation of the shackle 20 has caused the bearing elements 21 and 24 with their bearing faces 22 and 25 to apply themselves simultaneously against the end faces 23 and 26 of the bevel gears 4 and 5, whereby the smallest possible axial clearance is to be observed. Finally, the lid 33 is introduced into the assembly opening 32 so that the ring collar 34 bears against the radially outside, relative to the center axis 36, key faces of the fastening screws 27, whereby the fastening screws are secured against being turned so as to loosen them.

We claim:

1. An angle gear for a vehicle steering mechanism with two meshing bevel gears rigidly mounted on shafts which can be axially displaced in a housing and whose axes form an angle relative to each other, characterized in that on the housing there is maintained a support arrangement with bearing surfaces directed essentially perpendicular to the end faces of the bevel gears and bearing against said end faces of said gears for support of them against axial forces.

2. An angle gear as claimed in claim 1, characterized in that the support arrangement is designed for compensation of axial tolerance variations of the bevel gears.

3. An angle gear as claimed in claim 1, characterized in that the bearing surfaces have the shape of a spherical cup.

4. An angle gear as claimed in claims 1 or 3, characterized in that the bearing surfaces are coated with material diminishing wear and tear.

5. An angle gear as claimed in claims 1, 2 or 3, characterized in that the support arrangement comprises a shackle provided with the bearing surfaces, said shackle being adjustably fastened on two lateral support surfaces of the housing by means of fastening screws, said shackle extending essentially perpendicular to a line bisecting the angle between the bevel gear axes.

6. An angle gear as claimed in claim 5, characterized in that the shackle is provided with longitudinal slots for passage of the fastening screws.

7. An angle gear as claimed in claim 6, characterized in that the longitudinal slots are curved in the manner of a circular arc.

8. An angle gear as claimed in claim 5, characterized in that an assembly opening of the housing is arranged concentrically with the line bisecting the angle between the bevel gears, which opening can be closed by a lid that is provided with a circular ring collar that bears against radially outer key faces of the fastening screws.

* * * * *